US012633041B2

(12) United States Patent
Condon et al.

(10) Patent No.: US 12,633,041 B2
(45) Date of Patent: May 19, 2026

(54) MIXED REALITY VOLUME CAMERAS

(71) Applicant: Unity Technologies SF, San Francisco, CA (US)

(72) Inventors: Timothy S. Condon, South San Francisco, CA (US); Vladimir Vukicevic, Auburn, CA (US)

(73) Assignee: Unity Technologies SF, San Francisco, CA (US)

( * ) Notice: Subject to any disclaimer, the term of this patent is extended or adjusted under 35 U.S.C. 154(b) by 183 days.

(21) Appl. No.: 18/671,901

(22) Filed: May 22, 2024

(65) Prior Publication Data

US 2024/0394959 A1        Nov. 28, 2024

Related U.S. Application Data

(60) Provisional application No. 63/468,261, filed on May 22, 2023.

(51) Int. Cl.
*G06T 15/20* (2011.01)
*G06T 19/00* (2011.01)

(52) U.S. Cl.
CPC ............ *G06T 15/20* (2013.01); *G06T 19/006* (2013.01); *G06T 2219/024* (2013.01)

(58) Field of Classification Search
None
See application file for complete search history.

(56) References Cited

U.S. PATENT DOCUMENTS

| | | | |
|---|---|---|---|
| 2002/0109701 A1* | 8/2002 | Deering .............. | H04N 13/122 |
| | | | 348/E13.067 |
| 2012/0127169 A1* | 5/2012 | Barcay ................... | G06T 19/00 |
| | | | 345/419 |
| 2018/0253884 A1* | 9/2018 | Burnett, III ......... | H04N 13/351 |
| 2020/0279385 A1* | 9/2020 | Kirk ................. | G06Q 30/0201 |

* cited by examiner

*Primary Examiner* — Tapas Mazumder
(74) *Attorney, Agent, or Firm* — Schwegman Lundberg & Woessner, P.A.

(57)        ABSTRACT

A method of rendering 3D content in a mixed reality environment is disclosed. A volume camera is defined within first virtual environment. The volume camera is configured to capture a 3D volume of space. The defining includes setting parameters for a position or an orientation to be captured by the volume camera. A volume view transform is applied to the volume camera to establish a perspective of the volume camera within the 3D volume of space. The volume view transform is configured to define the position or the orientation relative to the 3D content in the 3D volume of space. Selected 3D content is processed within the 3D volume of space based on a configuration of the volume camera. The selected 3D content is rendered into a second virtual environment based on the configuration. The rendering includes adapting to a perspective of a user within the second virtual environment.

20 Claims, 5 Drawing Sheets

100

RECEIVE VOLUME CAMERA DEFINITION — 102

RECEIVE ONE OR MORE PARAMETER DEFINITIONS — 104

FOR A BOUNDED VOLUME CAMERA, SELECT OBJECTS — 106

MAP VOLUME TO MIXED REALITY SPACE — 108

PERFORM CLIPIPNG AND/OR CULLING — 110

MOVE WHAT'S VISIBLE IN THE VOLUME BASED ON MOVEMENT OF VOLUME CAMERA — 112

MIXED REALITY VOLUME CAMERAS

CROSS-REFERENCE TO RELATED APPLICATIONS

This application claims the benefit of U.S. Provisional Application No. 63/468,261, filed May 22, 2023, which is incorporated by reference herein in its entirety.

TECHNICAL FIELD

The subject matter disclosed herein generally relates to the technical field of computer graphics systems, and, in one specific example, to computer systems and methods for implementing a volume camera.

BACKGROUND 3D content that is created for an application, such as a game, is often very large; for example, a level in a game that consists of an entire arena. When this 3D content is rendered on a 2D screen, a virtual camera may be used to frame the portion of this content that is in view. However, this model does not work when the content is to be displayed in a mixed reality environment because the content is shown in three dimensions instead of on a 2D screen.

BRIEF DESCRIPTION OF THE DRAWINGS

Features and advantages of example embodiments of the present disclosure will become apparent from the following detailed description, taken in combination with the appended drawings, in which.

DETAILED DESCRIPTION

Figure 1:
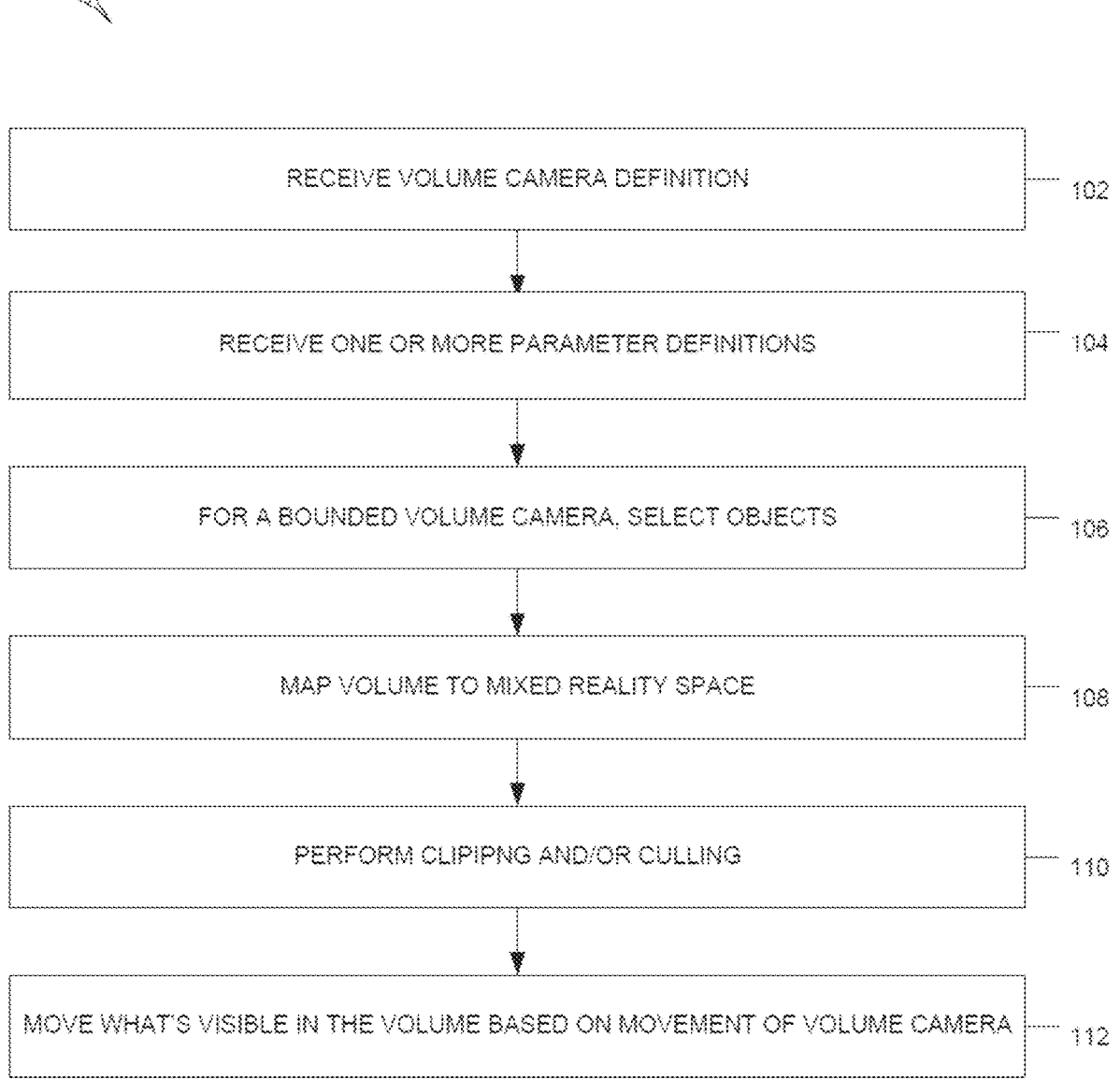
FIG. 1 is a flow chart illustrating example operations for implementing a volume camera.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the disclosed subject matter. It will be evident, however, to those skilled in the art, that various embodiments of the disclosed subject matter may be practiced without these specific details.

The present disclosure includes one or more apparatuses configured to perform one or more operations or one or more combinations of operations described herein, including data processing systems which perform these operations and computer readable media, which, when executed on data processing systems, cause the systems to perform these operations, the operations or combinations of operations including non-routine and unconventional operations or combinations of operations.

The systems and methods described herein include one or more components or operations that are non-routine or unconventional individually or when combined with one or more additional components or operations, because, for example, they provide a number of valuable benefits to digital content creators: for example, the methods and systems described herein allow for 3D content to be rendered in a 3D mixed reality environment using a similar model as what is used to render the 3D content on a 2D screen.

In the physical world, cameras capture light from a 3D volume and project the result into a 2D image or video (e.g., creating digital or analog images and video of the physical world surrounding a camera). In computational graphics, a virtual camera likewise captures objects within a volume of interest and renders them into a 2D viewport (e.g., displayed on a computer screen).

In either case, there may be at least two operations at play: the "view transform" and the "projection transform". The two operations may be implemented as mathematical operations (e.g., mathematical transforms). The view transform defines the camera's position and orientation—essentially, the "where" of the capture volume.

The projection transform defines the "shape" of the volume (a cube, a pyramid, or a frustum) and how the 3D content gets squashed into 2D. Projection transforms can be implemented as perspective and orthogonal. In example embodiments, virtual cameras provide additional features beyond these two basic operations (e.g., the view transform and the projection transform). For example, virtual cameras may supply a "culling mask" which defines which subset of layers should be rendered by the camera (e.g., wherein objects or parts thereof may be associated with a layer based on the object's position, type, metadata, orientation, and more); and/or virtual cameras may define culling bounds, which are used to reduce simulation costs for objects that aren't visible—for example, by skipping animation for skinned mesh that's outside of the visible region of any camera.

Volume cameras may provide some of the features provided by virtual cameras. For example, volume cameras may supply a view transform and size that defines the 3D volume of space whose content will be captured, provide a culling mask that can be used to include or exclude objects based on their layer, and/or instantiate and/or synchronize a "backing camera" that performs frustum culling. Volume cameras are most frequently but not necessarily box-like in shape; in principle, any partitioning of 3D space suffices, including concave, non-finite, and/or multipart representations. All properties of a volume camera can be animated or otherwise change over time, including but not limited to its size, transform, shape, culling mask, and dimensions.

In example embodiments, a projection transform (e.g., a perspective transform) may be specifically excluded (e.g., because it's lossy and non-invertible). Instead, a volume view hierarchy—e.g., including nested volume cameras and their 3D viewports, may be used to model an invertible arbitrary hierarchy of nested 3D content, and/or defer a final destructive projection transform until the last possible moment (e.g., when a 3D scene is finally rendered into one or more back buffers).

In example embodiments, a "volume camera" is used to transfer and/or render 3D content from a first environment into a second environment that is natively in 3D (e.g., a mixed reality environment, a second 3D virtual environment displayed in a different application or device, or the like). Accordingly, in example embodiments, a volume camera is used to frame a portion of 3D content (e.g., in view of the volume camera) from a first 3D environment for rendering into a second 3D environment, including defining what part of the first 3D environment should be visible (e.g., where the volume camera is looking), how perspective should be applied (e.g., by the camera parameters, such as field of view and focal length), and how much content is visible (e.g., by defining near and far clipping planes). In accordance with an embodiment, the first environment may be referred to as a client environment or client, an application that implements the first environment may be referred to as a client application, a device wherein the first environment is displayed may be referred to as a client device. In accordance with an embodiment, a second environment may be referred to as a host environment or host, an application that implements the second environment may be referred to as a host application, a device wherein the second environment is displayed may be referred to as a host device. In accordance with an embodiment, a volume camera may send content from a first environment (e.g., a first volume) to a plurality of second environments (e.g., in a one-to-many configuration). In accordance with an embodiment, a plurality of volume cameras in a first environment (e.g., looking at a common volume from different angles, having separate volumes that overlap in the first environment, or more) may transfer 3D content to a same destination (e.g., to a common destination volume, to overlapping volumes).

In accordance with an embodiment, a plurality of volume cameras may be nested wherein a destination volume (e.g., in a second environment) associated with a first volume camera becomes a host volume for a second volume camera (e.g., to transfer 3D content to a third 3D environment). Accordingly, 3D content may be transferred from 3D environment to 3D environment (e.g., in a chain of 3D environments).

In example embodiments, there is presented a "volume camera" that serves a similar purpose for rendering of 3D content in mixed reality environments as a virtual camera serves for rendering 3D content in 2D environments.

In example embodiments, a volume camera defines what part of the scene (e.g., a part of a 3D environment surrounding the volume camera) should be visible (e.g., by providing a bounding area that "selects" a portion of the scene). The volume camera may also define how this content (e.g., the part of the scene) is to be shown to the user (e.g., by supplying scaling or other transforms). It may also perform additional work (e.g., to generate geometry or in some other way "fill in" content that is clipped by the borders of the camera). As an example, if the volume camera is used to render a chunk of the earth's crust (e.g., viewed as if it had been carved out of the earth), the system would need to perform additional work to show the "layers" of earth on the sides of the volume. Multiple such bounded volumes may exist, selecting different parts of the scene for display in a 3D (e.g., mixed reality) world.

In example embodiments, a volume camera may define an unbounded space. In this case, the volume camera may specify how the mapping of real-world coordinates to scene coordinates should happen as well as distant clipping planes for culling far objects.

In example embodiments, a "bounded" volume or volume camera includes a volume or volume camera with positive, finite extents. In example embodiments, content fully outside the extents is culled, while content that falls on the border is clipped so that only polygons within the bounds are actually displayed (e.g., in the destination environment).

In example embodiments, an "unbounded" volume or volume camera includes a volume or volume camera whose size is infinite. Unbounded "volumes" have no borders, and unbounded volume cameras capture all objects without respect to their position.

In example embodiments, "exclusive mode" includes a situation where one and only one client application using one or more volume cameras is active. An alternative to "exclusive mode" is "shared mode."

In example embodiments, "shared mode" includes a situation where multiple client applications using one or more volume camera are resident and visible.

In example embodiments, a method of rendering 3D content in a mixed reality environment is disclosed. A volume camera is defined within first virtual environment. The volume camera is configured to capture a 3D volume of space. The defining includes setting parameters for a position or an orientation to be captured by the volume camera. A volume view transform is applied to the volume camera to establish a perspective of the volume camera within the 3D volume of space. The volume view transform is configured to define the position or the orientation relative to the 3D content in the 3D volume of space. Selected 3D content is processed within the 3D volume of space based on a configuration of the volume camera. The selected 3D content is rendered into a second virtual environment based on the configuration. The rendering includes adapting to a perspective of a user within the second virtual environment. In example embodiments, the second virtual environment is a mixed reality environment.

FIG. 1 is a flow chart of example operations for implementing a volume camera.

At operation 102, in a tool, such as an integrated development environment, or at runtime, a volume camera is defined. In example embodiments, defining the volume camera includes specifying the bounds (e.g., a cubic volume of some kind) that outline the region of a larger scene (e.g., 3D environment) to be rendered or shown. In alternative embodiments, the volume camera does not specify bounds (e.g., it is unbounded).

At operation 104, one or more other parameters are optionally defined, such as a scale and/or coordinate offset of the defined volume and/or how the boundary is to be handled (e.g., bounded or unbounded). In example embodiments, the one or more parameters may include a specification of a mask or other filtering of content (e.g., based on one or more criteria). In example embodiments, the one or more parameters may include a specification of one or more of a translation, rotation, scale, frame of reference, shape, or size.

At operation 106, for a bounded volume camera, object selection is performed. For example, objects falling within bounds included in the volume camera definition are identified.

At operation 108, for a bounded volume camera, the defined volume is mapped into a second 3D environment (e.g., within a mixed reality space). For example, one or more of a source translation, source rotation, source scale, source frame of reference, source shape, or source size may be mapped to one or more of a destination translation, destination rotation, destination scale, destination frame of reference, destination shape, or destination size.

In example embodiments, for an unbounded volume camera, the mapping may be from an unbounded source to an unbounded destination (e.g., based on a source transform to a destination transform).

At operation 110, clipping/culling, optional geometry generation, and/or one or more other operations is optionally performed (e.g., at the destination) (e.g., so that the selected region is shown properly within the mixed reality environment). In example embodiments, the one or more other operations may include run-time bounds checking of objects (e.g., to determine whether they are inside the mapped space). In example embodiments one or more of collision shapes or a box collider may be tested against corresponding bounds (e.g., box bounds or sphere bounds) of source content. In example embodiments, the one or more other operations may include fading edges (e.g., instead of hard clips), capping on cut geometry, and so on.

At operation 112, based on a movement of the volume camera (e.g., programmatically, via an API call), what's visible within the mapped volume in the second 3D environment (e.g., mixed reality world) also moves (e.g., in proper relation to the mapped mixed reality space). In example embodiments, the movement of the volume camera may be triggered by an interaction (e.g., a mouse action) with respect to the destination.

In example embodiments, input may be inverted. For example, if an input is received (e.g., with respect to the destination space), such as a selecting of an object with a mouse at the destination, coordinates of the interaction at the destination may be transformed into a frame of reference of the source. That is, forward transformations used for outputs rendered on the destination side may undergo an inverse transformation for inputs to be properly reflected and/or acted upon on the source side.

In example embodiments, the volume camera clearly defines how to select a portion of a larger scene for display in a second 3D environment (e.g., a mixed reality world, a second 3D scene, and the like), including providing for an explicit selection of a region and/or the ability to update that region in the second 3D environment as it moves in scene space.

In example embodiments, a volume camera is a custom component that can be added to any GameObject. The volume camera may define an oriented bounding box (OBB) whose content will be "captured" by the volume camera. Note that the volume may not directly render or display anything. The volume camera may simply determine which objects should be rendered, and/or compute their transforms relative to a canonical volume. In example embodiments, a 3D viewport then remaps this canonical volume to its own extent and/or does the actual rendering.

The fields of the component and/or the transform of the owning GameObject define the public API of the Volume Camera:

A mode field (e.g., VolumeCamera.mode) may initially take one of the following values: Bounded: The volume camera has finite bounds (e.g., as defined by a bounds dimensions field (e.g., boundsDimensions); Unbounded: The volume camera captures everything regardless of position, and the dimensions field is disabled and/or ignored.

A dimensions field (e.g., VolumeCamera.dimensions) may define the (unscaled) size of the camera's OBB; the world space dimensions may be calculated by element-wise multiplication of the dimensions field and the transform's scale.

A culling mask field (e.g., VolumeCamera.cullingMask) may define a bitmask of platform layers. In example embodiments, only objects belonging to one or more of the specified layers will be displayed by the volume camera.

A position of the transform may define the center of the camera's OBB.

A rotation of the transform may define the orientation of the camera's OBB.

The scale of the transform may be multiplied by the bounds dimensions field to determine the world-space size of the camera's OBB.

In example embodiments, volume cameras and their transforms can be modified and animated in real time; corresponding changes are accurately reflected by the backing environment. Activating or creating a volume camera will cause an attempt to instantiate a corresponding volume on the host; deactivating or destroying a volume will cause an attempt to remove the corresponding volume on the host.

In example embodiments, bounded volume cameras may display an indicator (e.g., a translucent green box gizmo) when selected in an IDE, indicating the region (e.g., defined volume) they will capture. Each volume camera can be selected (e.g., in the IDE) to open a camera preview pane that displays what's viewable.

Internally, volume cameras may be implemented similarly to virtual cameras.

In example embodiments, each volume camera instantiates a "backing camera," which is a virtual camera created to supply culling information to a runtime engine (e.g., game engine). These backing cameras may be isometric virtual cameras whose position, size, and/or clipping planes have been defined to exactly match the volume camera's OBB, and/or are updated every frame to ensure they remain in sync.

In example embodiments, whenever information about the host's own camera is available, each bounding volume also instantiates a host camera that reflects the available properties, but transformed into the client app's frame of reference. Examples of a host camera would be the play mode camera of a game engine, a WASD-driven perspective camera within a simulator, and the head-tracked camera of a head-mounted display (HMD).

The host camera may be configured to convey the relative transform of this system-level camera transformed into the space of each volume. When available, this host camera may be used to provide finer-grained culling information to a simulation (e.g., the Unity sim) than is possible with the backing camera. It can also be used as a volume-specific main camera from which the application can cast rays, attach transform children, and align-toward-viewer.

A preview camera may be similar to a Backing Camera, but may exist simply to help debug and visualize the 3D content of a scene, and may have no effect on actual culling or visibility. The preview camera may be a perspective camera (e.g., using a perspective projection transform) initialized to view only the 3D content layer, and it may be a transform child of the volume camera, and whereby its initial transform is initialized to be the same as that of the main camera transformed into the space of the volume camera. Unlike other cameras, the preview camera can be modified freely by the app or user, and in some example embodiments, no effort will be made to keep it in sync post-initialization.

In example embodiments, when an XR Origin is present in a scene using the volume runtime (e.g., when an "Enable Volume Runtime" is checked), a volume camera component is automatically added to the XR Origin GameObject during object creation. This volume camera is unbounded (size of zero). If the XR Origin has a child camera, the culling mask field of the volume camera may be initialized to that of the first such child camera; otherwise, its culling mask may be set to "everything" (e.g., unbounded).

Figure 2A:
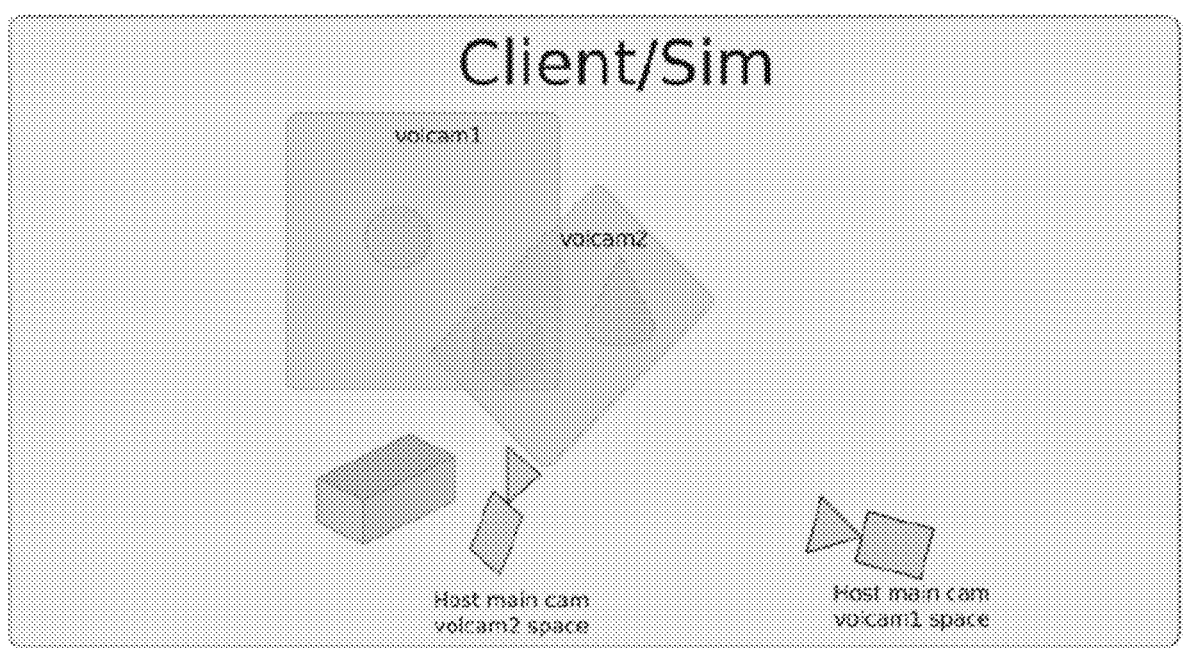
FIG. 2A is a block diagram illustrating an example client or simulation in which a volume camera is implemented.

FIG. 2A is a block diagram illustrating an example client or simulation in which a volume camera is implemented.

Figure 2B:
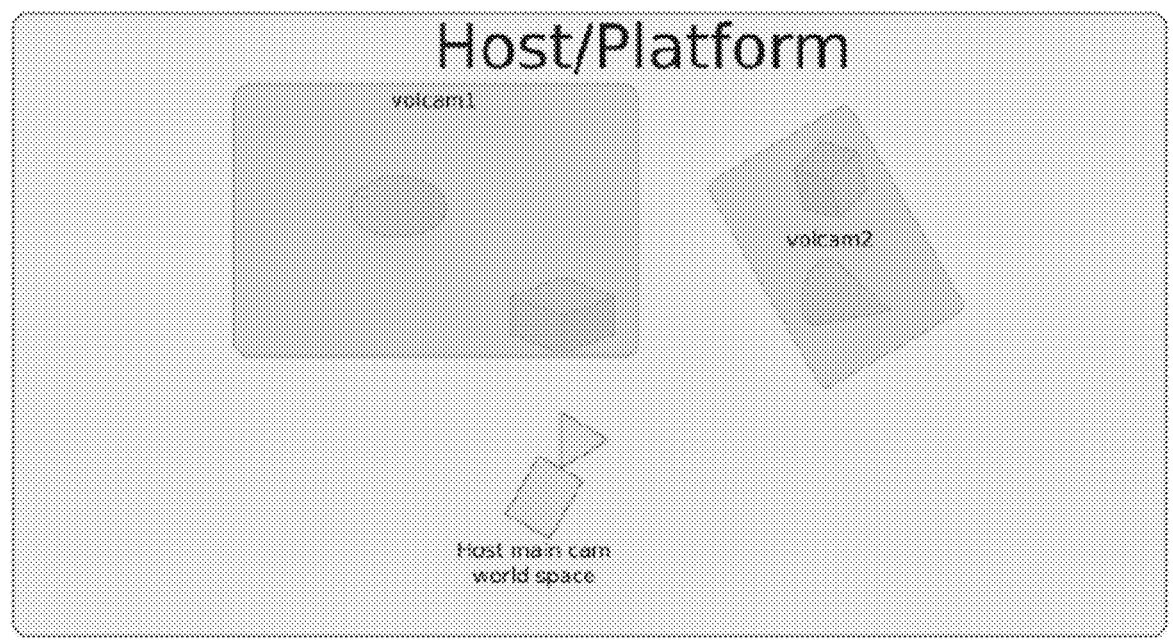
FIG. 2B is a block diagram illustrating an example host or platform in which a volume camera is implemented.

FIG. 2B is a block diagram illustrating an example host or platform in which a volume camera is implemented.

Figure 3:
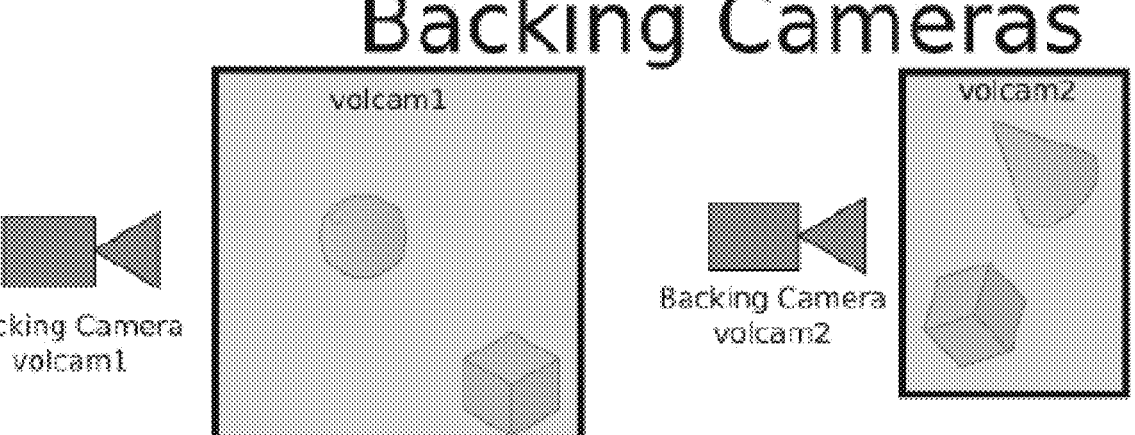
FIG. 3 is a block diagram illustrating an example implementation of one or more backing cameras.

FIG. 3 is a block diagram illustrating an example implementation of one or more backing cameras.

In example embodiments, the system utilizes a volume camera to facilitate the rendering and management of three-dimensional (3D) content across two virtual environments. The first virtual environment (e.g., the "client environment") may serve as an initial setting where 3D content is generated, manipulated, or interacted with by users. This environment may be hosted on a client device or application, which may implement the volume camera to capture and process the 3D content within its defined volume of space.

The second virtual environment (e.g., the "host environment") may be where the 3D content captured and processed by the volume camera in the first environment is subsequently rendered for further interaction or display. This environment may be hosted on a different platform or device, facilitating a broader or different mode of interaction compared to the client environment. In example embodiments, the second virtual environment may be a mixed reality environment, as described herein. In example embodiments, the mixed reality environment integrates elements of both real and virtual worlds, providing an immersive experience where physical and digital objects coexist and interact in real time.

In example embodiments, an aspect included in the volume camera technology is an implementation of a "volume view transform." This transform is distinct from traditional view/projection transforms in that it does not project 3D data into a 2D representation but maintains the full three-dimensional integrity of the captured content. The volume view transform defines the camera's position and orientation in a way that optimizes the capture and rendering of 3D content within the volumetric space defined by the camera. This transform may be used for applications where maintaining the spatial and geometric accuracy of the 3D environment is useful.

The volume view transform may handle complex 3D environments without resorting to lossy operations associated with perspective projections. This approach not only enhances the quality of the rendered images but also ensures that all spatial relationships within the 3D content are preserved, which may be useful for applications such as virtual reality simulations, architectural visualizations, and interactive educational tools.

The selection of 3D content by the volume camera determines which parts of the 3D environment are captured and transferred to the second virtual environment. This selection may be based on parameters such as the camera's position, orientation, dimensions, bounds, or predefined culling masks, which may help in filtering the content that falls within the camera's view. The volume camera may also utilize a backing camera that performs frustum culling to optimize the content selection process (e.g., by excluding objects outside of the visible region), thereby enhancing processing efficiency and performance.

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 4:
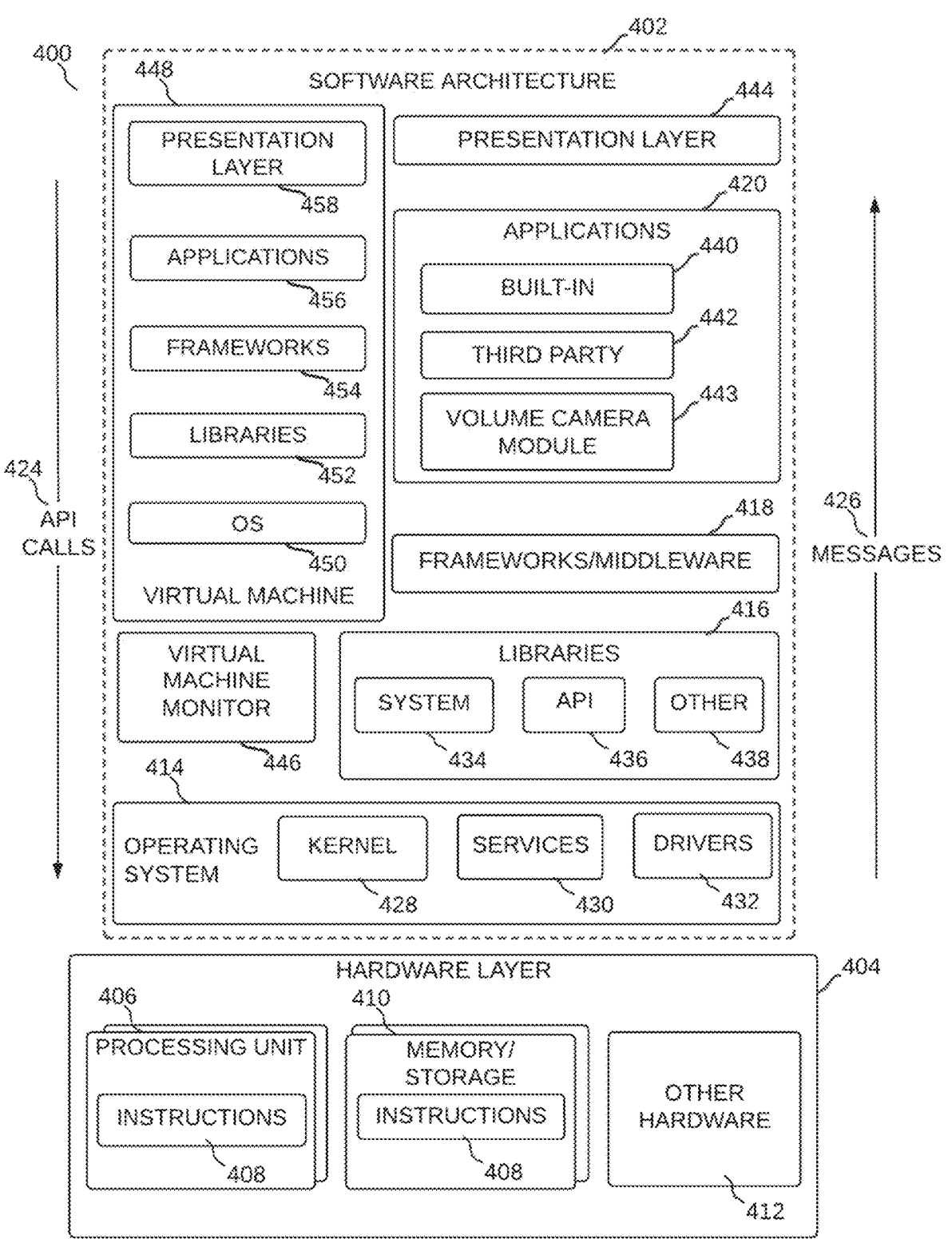
FIG. 4 is a block diagram illustrating an example software architecture, which may be used in conjunction with various hardware architectures described herein.

FIG. 4 is a block diagram 400 illustrating an example software architecture 402, which may be used in conjunction with various hardware architectures herein described to provide a gaming engine (e.g., runtime engine) and/or components of the interactive tile-based ML terrain generation system. FIG. 4 is a non-limiting example of a software architecture and it will be appreciated that many other architectures may be implemented to facilitate the functionality described herein. The software architecture 402 may execute on hardware such as a machine 500 of FIG. 5 that includes, among other things, processors 510, memory 530, and input/output (I/O) components 550. A representative hardware layer 404 is illustrated and can represent, for example, the machine 500 of FIG. 5. The representative hardware layer 404 includes a processing unit 406 having associated executable instructions 408. The executable instructions 408 represent the executable instructions of the software architecture 402, including implementation of the methods, modules and so forth described herein. The hardware layer 404 also includes memory/storage 410, which also includes the executable instructions 408. The hardware layer 404 may also comprise other hardware 412.

In the example architecture of FIG. 4, the software architecture 402 may be conceptualized as a stack of layers where each layer provides particular functionality. For example, the software architecture 402 may include layers such as an operating system 414, libraries 416, frameworks or middleware 418, applications 420 and a presentation layer 444. Operationally, the applications 420 and/or other components within the layers may invoke application programming interface (API) calls 424 through the software stack and receive a response as messages 426. The layers illustrated are representative in nature and not all software architectures have all layers. For example, some mobile or special purpose operating systems may not provide the frameworks/middleware 418, while others may provide such a layer. Other software architectures may include additional or different layers.

The operating system 414 may manage hardware resources and provide common services. The operating system 414 may include, for example, a kernel 428, services 430, and drivers 432. The kernel 428 may act as an abstraction layer between the hardware and the other software layers. For example, the kernel 428 may be responsible for memory management, processor management (e.g., scheduling), component management, networking, security settings, and so on. The services 430 may provide other common services for the other software layers. The drivers 432 may be responsible for controlling or interfacing with the underlying hardware. For instance, the drivers 432 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 416 may provide a common infrastructure that may be used by the applications 420 and/or other components and/or layers. The libraries 416 typically provide functionality that allows other software modules to perform tasks in an easier fashion than to interface directly with the underlying operating system 414 functionality (e.g., kernel 428, services 430 and/or drivers 432). The libraries 516 may include system libraries 434 (e.g., C standard library) that may provide functions such as memory allocation functions, string manipulation functions, mathematic functions, and the like. In addition, the libraries 416 may include API libraries 436 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 416 may also include a wide variety of other libraries 438 to provide many other APIs to the applications 420 and other software components/modules.

The frameworks 418 (also sometimes referred to as middleware) provide a higher-level common infrastructure that may be used by the applications 420 and/or other software components/modules. For example, the frameworks/middleware 418 may provide various graphic user interface (GUI) functions, high-level resource management, high-level location services, and so forth. The frameworks/middleware 418 may provide a broad spectrum of other APIs that may be utilized by the applications 420 and/or other software components/modules, some of which may be specific to a particular operating system or platform.

The applications 420 include built-in applications 440 and/or third-party applications 442. Examples of representative built-in applications 440 may include, but are not limited to, a contacts application, a browser application, a book reader application, a location application, a media application, a messaging application, and/or a game application. Third-party applications 442 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 442 may invoke the API calls 424 provided by the mobile operating system such as operating system 414 to facilitate functionality described herein. Applications 420 may include a volume camera module 443 which may implement the example operations 100 described in at least FIG. 1.

The applications 420 may use built-in operating system functions (e.g., kernel 428, services 430 and/or drivers 432), libraries 416, or frameworks/middleware 418 to create user interfaces to interact with users of the system. Alternatively, or additionally, in some systems, interactions with a user may occur through a presentation layer, such as the presentation layer 444. In these systems, the application/module "logic" can be separated from the aspects of the application/module that interact with a user.

Some software architectures use virtual machines. In the example of FIG. 4, this is illustrated by a virtual machine 448. The virtual machine 448 creates a software environment where applications/modules can execute as if they were executing on a hardware machine (such as the machine 500 of FIG. 5, for example). The virtual machine 448 is hosted by a host operating system (e.g., operating system 414) and typically, although not always, has a virtual machine monitor 446, which manages the operation of the virtual machine 448 as well as the interface with the host operating system (i.e., operating system 414). A software architecture executes within the virtual machine 448 such as an operating system (OS) 450, libraries 452, frameworks 454, applications 456, and/or a presentation layer 458. These layers of software architecture executing within the virtual machine 448 can be the same as corresponding layers previously described or may be different.

Figure 5:
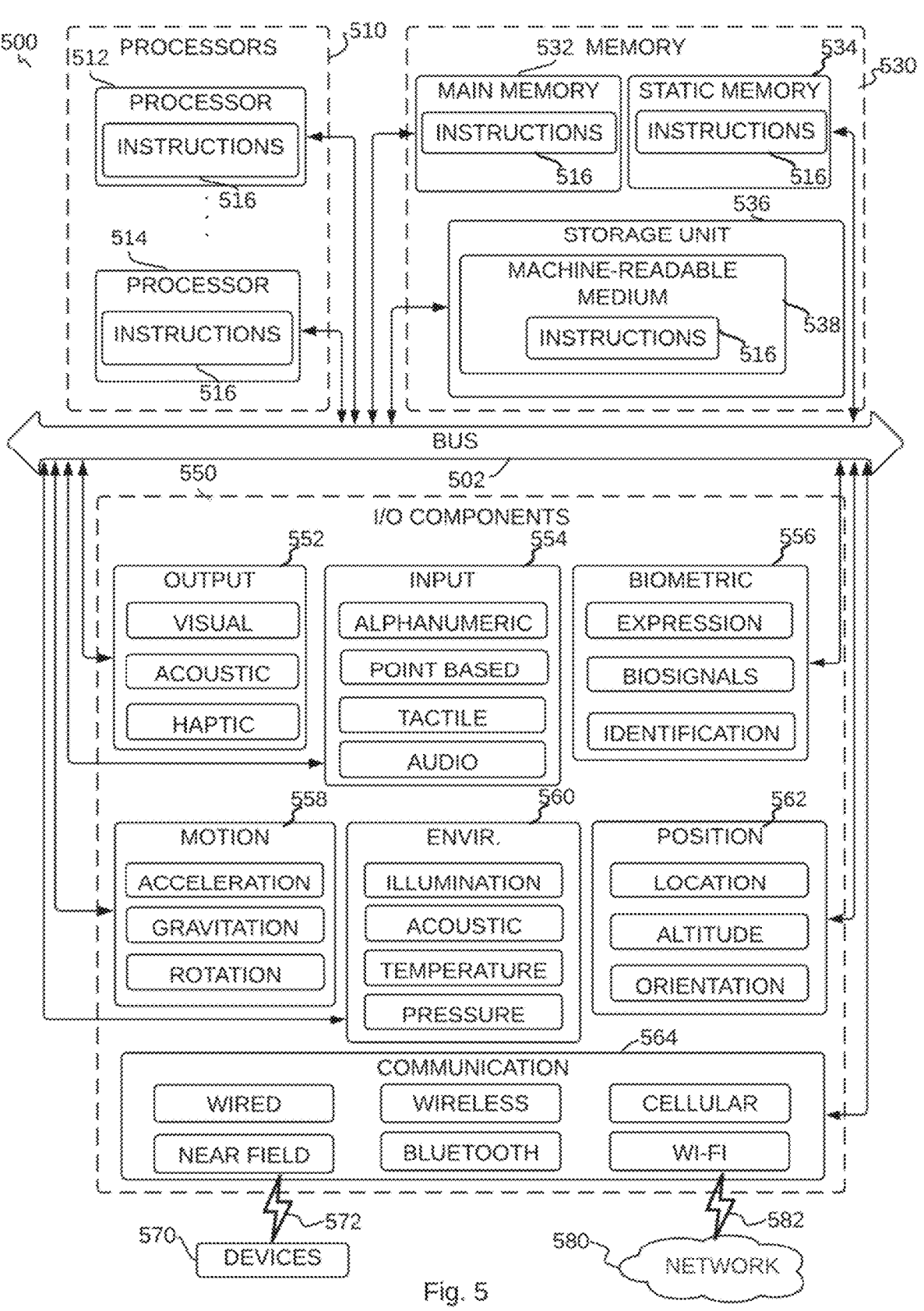
FIG. 5 is a block diagram illustrating components of a machine, according to some example embodiments, configured to read instructions from a machine-readable medium (e.g., a machine-readable storage medium) and perform any one or more of the methodologies discussed herein.

FIG. 5 is a block diagram illustrating components of a machine 500, according to some example embodiments, configured to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. As such, the instructions 516 may be used to implement modules or components described herein. The instructions transform the general, non-programmed machine into a particular machine programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines that individually or jointly execute the instructions 516 to perform any one or more of the methodologies discussed herein.

The machine 500 may include processors 510, memory 530, and input/output (I/O) components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 512 and a processor 514 that may execute the instructions 516. The term "processor" is intended to include multi-core processor that may comprise two or more independent processors (sometimes referred to as "cores") that may execute instructions contemporaneously. Although FIG. 5 shows multiple processors, the machine 500 may include a single processor with a single core, a single processor with multiple cores (e.g., a multi-core processor), multiple processors with a single core, multiple processors with multiples cores, or any combination thereof.

The memory/storage 530 may include a memory, such as a main memory 532, a static memory 534, or other memory, and a storage unit 536, both accessible to the processors 510 such as via the bus 502. The storage unit 536 and memory 532, 534 store the instructions 516 embodying any one or more of the methodologies or functions described herein. The instructions 516 may also reside, completely or partially, within the memory 532, 534, within the storage unit 536, within at least one of the processors 510 (e.g., within the processor's cache memory), or any suitable combination thereof, during execution thereof by the machine 500. Accordingly, the memory 532, 534, the storage unit 536, and the memory of processors 510 are examples of machine-readable media 538.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine 500 (e.g., processors 510), cause the machine 500 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 550 may include a wide variety of components to receive input, provide output, produce output, transmit information, exchange information, capture measurements, and so on. The specific input/output (I/O) components 550 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 550 may include many other components that are not shown in FIG. 5. The input/output (I/O) components 550 are grouped according to functionality merely for simplifying the following discussion and the grouping is in no way limiting. In various example embodiments, the input/output (I/O) components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 550 may include communication components 564 operable to couple the machine 500 to a network 580 or devices 570 via a coupling 582 and a coupling 572 respectively. For example, the communication components 564 may include a network interface component or other suitable device to interface with the network 580. In further examples, the communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a Universal Serial Bus (USB)).

Moreover, the communication components 564 may detect identifiers or include components operable to detect identifiers. For example, the communication components 564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 562, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The term 'content' used throughout the description herein should be understood to include all forms of media content items, including images, videos, audio, text, 3D models (e.g., including textures, materials, meshes, and more), animations, vector graphics, and the like.

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein should be understood to include 2D digital environments (e.g., 2D video game environments, 2D simulation environments, 2D content creation environments, and the like), 3D digital environments (e.g., 3D game environments, 3D simulation environments, 3D content creation environments, virtual reality environments, and the like), and augmented reality environments that include both a digital (e.g., virtual) component and a real-world component.

The term 'digital object', used throughout the description herein is understood to include any object of digital nature, digital structure or digital element within an environment. A digital object can represent (e.g., in a corresponding data structure) almost anything within the environment, including, for example, 3D models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'digital object' may also be understood to include linked groups of individual digital objects. A digital object is associated with data that describes properties and behavior for the object.

The terms 'asset', 'game asset', and 'digital asset', used throughout the description herein are understood to include any data that can be used to describe a digital object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more digital objects within a game at runtime (e.g., during execution of the game).

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

What is claimed is:

1. A non-transitory computer-readable storage medium storing a set of instructions that, when executed by one or more computer processors, causes the one or more computer processors to perform operations, the operations comprising:

defining a volume camera within a first virtual environment, wherein the volume camera is configured to capture a 3D volume of space, the defining including setting parameters for a position or an orientation to be captured by the volume camera;

applying a volume view transform to 3D content within the 3D volume of space, wherein the volume view transform is configured to define the position or the orientation relative to the 3D content in the 3D volume of space;

processing selected 3D content within the 3D volume of space based on a configuration of the volume camera; and rendering the selected 3D content into a second virtual environment based on the configuration, the rendering including adapting to a perspective of a user within the second virtual environment.

2. The non-transitory computer-readable storage medium of claim 1, the operations further comprising maintaining an integrity of the 3D content or excluding one or more perspective projection transforms from the volume camera.

3. The non-transitory computer-readable storage medium of claim 1, the operations further comprising implementing nested volume cameras within the second virtual environment, wherein the second virtual environment is a mixed reality environment and each nested volume camera captures a distinct portion of the 3D volume of space and allows for hierarchical structuring of 3D viewports.

4. The non-transitory computer-readable storage medium of claim 1, the operations further comprising dynamically changing one or more properties of the volume camera over time to adapt to changes in the second virtual environment.

5. The non-transitory computer-readable storage medium of claim 1, the operations further comprising using an unbounded volume camera for capturing and rendering the 3D content in scenarios where the 3D volume of space extends infinitely, thereby enabling continuous expansion of the second virtual environment without predefined spatial limits.

6. The non-transitory computer-readable storage medium of claim 1, the operations further comprising using a bounded volume camera for capturing and rendering the 3D content in scenarios where the 3D volume of space is defined by a configurable boundary.

7. The non-transitory computer-readable storage medium of claim 1, the operations further comprising operating the volume camera in shared mode in which a plurality of client applications simultaneously use the volume camera, the shared mode facilitating collaborative interactions and multi-user experiences within the second virtual environment.

8. A method comprising:

defining a volume camera within a first virtual environment, wherein the volume camera is configured to capture a 3D volume of space, the defining including setting parameters for a position or an orientation to be captured by the volume camera;

applying a volume view transform to 3D content within the 3D volume of space, wherein the volume view transform is configured to define the position or the orientation relative to the 3D content in the 3D volume of space;

processing selected 3D content within the 3D volume of space based on a configuration of the volume camera; and rendering the selected 3D content into a second virtual environment based on the configuration, the rendering including adapting to a perspective of a user within the second virtual environment.

9. The method of claim 8, further comprising maintaining an integrity of the 3D content or excluding one or more perspective projection transforms from the volume camera.

10. The method of claim 8, further comprising implementing nested volume cameras within the second virtual environment, wherein the second virtual environment is a mixed reality environment and each nested volume camera captures a distinct portion of the 3D volume of space and allows for hierarchical structuring of 3D viewports.

11. The method of claim 8, further comprising dynamically changing one or more properties of the volume camera over time to adapt to changes in the second virtual environment.

12. The method of claim 8, further comprising using an unbounded volume camera for capturing and rendering the 3D content in scenarios where the 3D volume of space extends infinitely, thereby enabling continuous expansion of the second virtual environment without predefined spatial limits.

13. The method of claim 8, further comprising using a bounded volume camera for capturing and rendering the 3D content in scenarios where the 3D volume of space is defined by a configurable boundary.

14. The method of claim 8, further comprising operating the volume camera in shared mode in which a plurality of client applications simultaneously use the volume camera, the shared mode facilitating collaborative interactions and multi-user experiences within the second virtual environment.

15. A system comprising:

one or more computer processors;

one or more computer memories;

a set of instructions stored in the one or more computer memories, the set of instructions configuring the one or more computer processors to perform operations, the operations comprising:

defining a volume camera within a first virtual environment, wherein the volume camera is configured to capture a 3D volume of space, the defining including setting parameters for a position or an orientation to be captured by the volume camera;

applying a volume view transform to 3D content within the 3D volume of space, wherein the volume view transform is configured to define the position or the orientation relative to 3D content in the 3D volume of space;

processing selected 3D content within the 3D volume of space based on a configuration of the volume camera; and rendering the selected 3D content into a second virtual environment based on the configuration, the rendering including adapting to a perspective of a user within the second virtual environment.

16. The system of claim 15, the operations further comprising maintaining an integrity of the 3D content or excluding one or more perspective projection transforms from the volume camera.

17. The system of claim 15, the operations further comprising implementing nested volume cameras within the second virtual environment, wherein the second virtual environment is a mixed reality environment and each nested volume camera captures a distinct portion of the 3D volume of space and allows for hierarchical structuring of 3D viewports.

18. The system of claim 15, the operations further comprising dynamically changing one or more properties of the volume camera over time to adapt to changes in the second virtual environment.

19. The system of claim 15, the operations further comprising using an unbounded volume camera for capturing and rendering the 3D content in scenarios where the 3D volume of space extends infinitely, thereby enabling continuous expansion of the second virtual environment without predefined spatial limits.

20. The system of claim 15, the operations further comprising using a bounded volume camera for capturing and rendering the 3D content in scenarios where the 3D volume of space is defined by a configurable boundary.

* * * * *